United States Patent Office 3,101,056
Patented Aug. 20, 1963

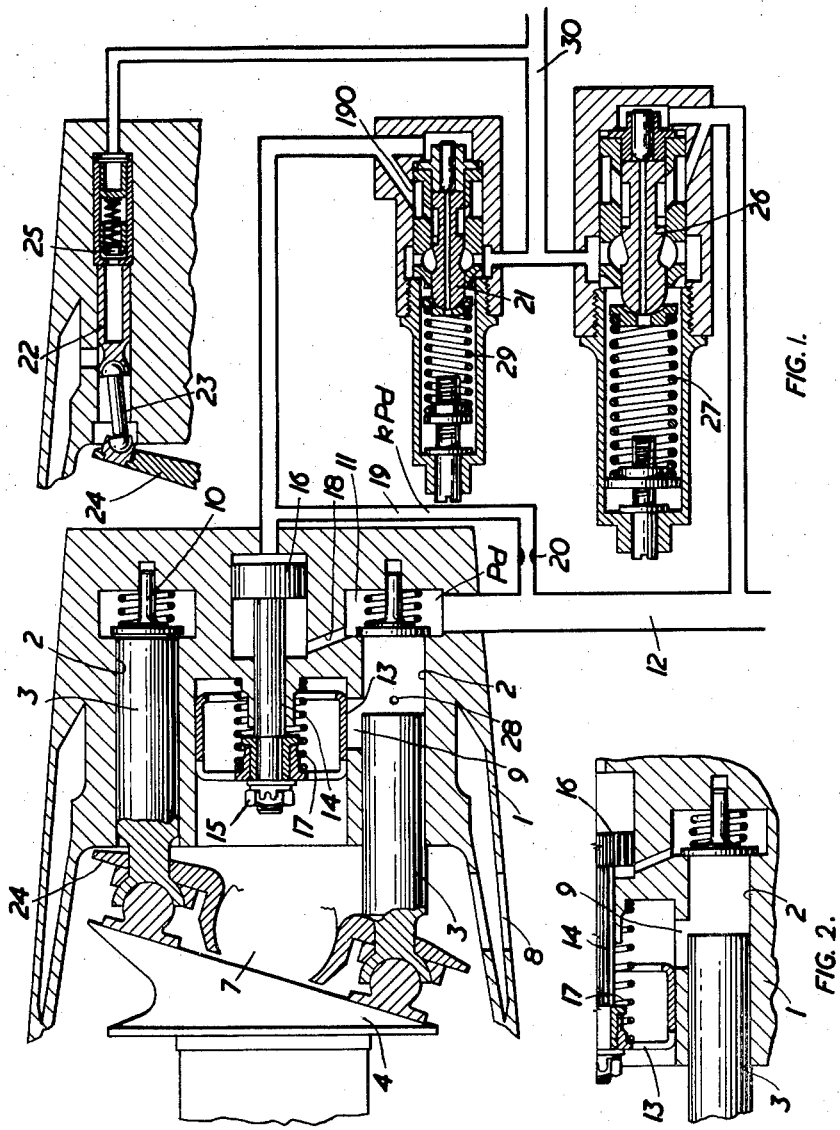

3,101,056
RECIPROCATING PUMPS
Bertram Anthony Peaster, Codsall, England, assignor to Integral Limited, Wolverhampton, Staffordshire, England, a British company
Filed July 7, 1961, Ser. No. 122,480
Claims priority, application Great Britain July 18, 1960
3 Claims. (Cl. 103—37)

In United States application No. 686,996, now abandoned, I have described a variable delivery hydraulic pump in which the delivery pressure is controlled in accordance with variations in load by means of adjustable spill sleeves surrounding the pump plungers, the control being effected by a servo piston subject at one side to the delivery pressure of the pump and at the other side to the pressure in a control conduit permitting of restricted flow to the servo piston of liquid discharged by the pump and having an outlet controlled by a biased control valve subject to the hydraulic pressure in the control conduit and moving to increase and decrease the area of the outlet in response respectively to increase and decrease in said hydraulic pressure, the servo piston being provided with means for balancing it against the hydraulic pressure difference across it and moving under control of the control valve to increase or decrease the spill from the pump cylinders in response respectively to decrease and increase in the flow requirements of the system supplied by the pump.

The present invention provides a modified construction of variable delivery hydraulic pump in which the servo piston, instead of adjusting the flow in accordance with variation in load by means of a spill system, effects this adjustment by variable throttling of the inlets to the pump cylinders. This modified construction has advantages over control by a spill system, notably that undesirable spill losses are avoided.

According to a feature of the invention, one of the pump plungers is effective to provide a high pressure bleed to the servo piston when the pump is off-loaded. Provision is also made for a by-pass flow to cool the pump when operating under conditions of zero or near zero flow.

One embodiment of the invention will now be described in more detail, by way of example, with reference to the accompanying diagrammatic drawing in which:

FIG. 1 shows the pump nearly in the off-load condition and FIG. 2 shows part of the pump with the parts in the position which they occupy in the full load condition.

The pump casing 1 contains a number of pump cylinders 2 arranged in a circle and each containing a plunger 3. The plungers 3 are reciprocated by a swashplate 4. Liquid enters the interior 7 of the casing from an inlet 8 and is drawn into each cylinder 2 on the suction stroke through an inlet 9. This liquid is discharged on the delivery stroke of the plungers 3 through discharge valves 10 to an annular space 11 which communicates with a delivery line 12. A piston valve 13 controls the amount of liquid drawn into the cylinders. When the valve is in the position shown in FIG. 2 the pump is on maximum delivery. It is on minimum delivery when the valve 13 is in the position shown in FIG. 1. The valve 13 is connected by a nut 15 to the piston rod 14 of a servo piston 16 and is loaded by a spring 17. The servo piston 16 is concentric with the circle in which the cylinders 2 are arranged.

The left hand face of the piston 16 is subject, through a duct 18 communicating with the space 11, to the pump delivery pressure Pd and its right hand face is subject to the lower pressure kPd prevailing in a control conduit 19 connected to the delivery line 12 of the pump via a restrictor 20. The conduit 19 has an outlet 190 through which liquid can flow to a by-pass line 30 under control of a control valve 21 similar to that described in United States specification No. 686,996. The valve 21 is subject at its right hand end to the hydraulic pressure in the conduit 19 and at its left-hand end to the load of a spring 29. The valve 21 operates to increase and decrease the area of the outlet 190 in response respectively to increase and decrease in the hydraulic pressure in the conduit 19 and so cause the servo piston 16 to adjust the valve 13 in accordance with the flow requirements of the system supplied by the pump.

The outer portion of the reciprocable slide member of valve 21 is urged by the liquid entering through the main branch of conduit 19 slightly to the left, as viewed in the drawing. The liquid also acts upon the pin-shaped plug in the rearward bore of said outer slide portion and urges the same to the left, together with the cylindrical inner portion of the slide member, which bears against the biasing spring. The respective movements of the two slide portions establish communication between the branch 190 of conduit 19 and the annular chamber of the valve which leads to line 30.

Liquid is drawn into the cylinders 2 of the pump by the degree of vacuum caused by the plungers 3 on their return stroke and the filling of the cylinders will depend upon the relation between the pressure drop across the inlet ports 9 and the vacuum produced in the cylinders on the return stroke of the plungers. This pressure drop varies with the position of the valve 13 and the delivery of the pump will accordingly be determined by the position of the servo piston 16, being a maximum when the piston 16 is at the left-hand end of its cylinder (FIG. 2) and a minimum when the piston 16 is at the right hand end of its cylinder (FIG. 1).

The servo piston 16 is maintained operative by the high pressure bleed through the conduit 19. To ensure that this flow is maintained under conditions of zero flow in the delivery line 12, a small bleed hole 28, communicating with the interior of the casing, is provided in one of the cylinders 2, thus permitting the plunger 3 in that cylinder to maintain the servo flow while off-load power is nevertheless kept to a minimum.

A separate by-pass flow is provided for cooling the pump under all flow conditions. This flow is provided in the construction illustrated by a piston 22 which is reciprocated by means of a nutating plate 24, which moves with the swashplate, through the agency of a knuckle jointed lever 23. The piston 22 draws liquid from the interior of the pump casing and discharges it through a non-return valve 25 to the by-pass line 30. The horizontal U-shaped hollow piston 22 is repeatedly withdrawn by action of the members 23, 24 until a lateral bore provided in the casing wall is cleared which communicates with the interior 7.

A relief valve 26, subject at its right-hand end to the pressure of a spring 27, is provided between the delivery line 12 and the by-pass line 30. The inner mechanism of valve 26 is similar to that described hereinabove in connection with valve 21, the input being from line 12 while the liquid is temporarily discharged to the by-pass line 30.

What I claim as my invention and desire to secure by Letters Patent is:

1. A hydraulic pump having variable liquid delivery, comprising, in combination, a plurality of parallel-connected pump cylinders having inlet and outlet openings for said liquid and plungers reciprocable in said cylinders, servo means for controlling the liquid delivery of the pump, a first conduit connecting one side of said servo means to the delivery pressure of the pump, a second conduit connecting the other side of said servo means to restricted flow of said liquid, thus producing a hydraulic pressure difference across said servo means, means for biasing said servo means in aiding relationship to said restricted flow, a control valve operatively connected to said second conduit, means for biasing said control valve against said restricted flow, the pump outlet being controlled by movements of said control valve in proportion to the hydraulic pressure of said restricted flow, and valve means controlled by movements of said servo means for throttling the effective area of said pump cylinder inlets in inverse proportion to said pressure difference, whereby said liquid delivery is regulated in response to the flow requirements of the system supplied by the pump, one of said cylinders having a bleed hole communicating with the liquid inlet of the pump, whereby said servo means is adapted to operate when the pump is off-loaded.

2. A pump according to claim 1, wherein said servo means comprises a piston acted upon by said pressure difference, said pump cylinders are concentrically arranged with respect to said piston, and wherein said valve means comprises throttling valves progressively closing and opening said cylinder inlets upon respective increase and decrease of said delivery pressure.

3. A pump according to claim 1, further comprising by-pass valve means actuated simultaneously with said plungers and adapted to maintain minimum flow of liquid through the pump at substantially zero values of said liquid delivery.

References Cited in the file of this patent

UNITED STATES PATENTS

| 1,931,543 | High | Oct. 24, 1933 |

FOREIGN PATENTS

| 820,417 | Great Britain | Sept. 23, 1959 |
| 822,214 | Great Britain | Oct. 21, 1959 |
| 1,201,441 | France | July 15, 1959 |